(12) United States Patent　　(10) Patent No.: US 7,505,095 B2
Lin　　(45) Date of Patent: *Mar. 17, 2009

(54) DISPLAY PANEL, AND DISPLAY DEVICE AND ELECTRONIC DEVICE USING THEREOF

(75) Inventor: Chi-Huang Lin, Yongkang (TW)

(73) Assignee: TPO Displays Corp., Chu-Nan (TW)

( * ) Notice: Subject to any disclaimer, the term of this patent is extended or adjusted under 35 U.S.C. 154(b) by 293 days.

This patent is subject to a terminal disclaimer.

(21) Appl. No.: 11/199,679

(22) Filed: Aug. 8, 2005

(65) Prior Publication Data

US 2006/0061710 A1　　Mar. 23, 2006

Related U.S. Application Data

(63) Continuation-in-part of application No. 10/975,303, filed on Oct. 27, 2004, now Pat. No. 7,265,801.

(60) Provisional application No. 60/612,097, filed on Sep. 21, 2004.

(51) Int. Cl.
*G02F 1/1335* (2006.01)
*G02F 1/13363* (2006.01)

(52) U.S. Cl. .......................... 349/99; 349/119; 349/179

(58) Field of Classification Search .................. 349/96, 349/99, 101, 117, 118, 119, 120, 121, 123, 349/179, 180
See application file for complete search history.

(56) References Cited

U.S. PATENT DOCUMENTS

| | | | |
|---|---|---|---|
| 4,909,603 A | 3/1990 | Taniguchi |
| 5,291,323 A | 3/1994 | Ohnishi et al. |
| 5,410,422 A | 4/1995 | Bos |
| 5,504,603 A | 4/1996 | Winker et al. |
| 5,583,678 A * | 12/1996 | Nishino et al. | ............... 349/118 |

(Continued)

FOREIGN PATENT DOCUMENTS

JP　　04-009006　　1/1992

(Continued)

OTHER PUBLICATIONS

Liu, Yong-Zhi, "Liquid Crystal Display Technology", Published on Dec. 31, 2000, Electronic Technology Publisher, China.

*Primary Examiner*—Dung Nguyen
*Assistant Examiner*—Tai Duong
(74) *Attorney, Agent, or Firm*—Liu & Liu

(57) ABSTRACT

A display panel includes a first substrate, a second a second substrate a second a second substrate parallel and opposite to the first substrate, a liquid crystal molecules disposed between the first substrate and the second substrate, a first and a second polarizers disposed over the first and the second substrates respectively. The first surface of the first substrate close to the liquid crystal molecules and a second surface of the second substrate close to the liquid crystal molecules includes a first alignment surface and a second alignment surface, wherein an angle between the alignment directions of the first and the second alignment surfaces is in a range of about 90°. The angle between a direction of the absorption axis of the first polarizer/the second polarizer and the alignment direction of the first alignment surface/the second alignment surface is in a range of about 45° respectively.

18 Claims, 21 Drawing Sheets

U.S. PATENT DOCUMENTS

| | | |
|---|---|---|
| 5,777,709 A | 7/1998 | Xu |
| 5,859,681 A | 1/1999 | VanderPloeg et al. |
| 6,055,033 A * | 4/2000 | Yamaguchi et al. ......... 349/101 |
| 6,919,946 B2 | 7/2005 | Allen et al. |
| 2003/0071946 A1 | 4/2003 | Hirota et al. |
| 2005/0162592 A1 | 7/2005 | Hirakata et al. |
| 2006/0007376 A1 | 1/2006 | Fukuda et al. |
| 2006/0044501 A1 | 3/2006 | Mizusako |
| 2007/0206141 A1 | 9/2007 | Lu et al. |

FOREIGN PATENT DOCUMENTS

| | | |
|---|---|---|
| JP | 2001-356345 | 12/2001 |
| JP | 2004-004950 | 1/2004 |
| WO | 2004042461 | 5/2004 |

* cited by examiner

DISPLAY PANEL, AND DISPLAY DEVICE AND ELECTRONIC DEVICE USING THEREOF

CROSS-REFERENCE TO RELATED APPLICATION

This application is a continuation-in-part of U.S. patent application Ser. No. 10/975,303, filed on Oct. 27, 2004, now U.S. Pat. No. 7,265,801, which claims the priority benefits of U.S. provisional application No. 60/612,097, titled "NEW WIDE VIEW TN DESIGN", filed on Sep. 21, 2004. The disclosures of these applications are incorporated herein by reference.

BACKGROUND OF THE INVENTION

1. Field of the Invention

The present invention relates to a display panel. More particularly, the present invention relates to a display panel of a liquid crystal display device.

2. Description of Related Art

Conventionally, the application of liquid crystal material as liquid crystal display (LCD) has been broadly used in many display fields. The generation of LCD twisted nematic (TN), super twisted nematic (STN) LCD and double layer STN-LCD has evolved to the use of thin film transistor (TFT) as pixel switching elements. The conventional LCD has advantages of thin thickness, light-weight, low power consuming and radiation free compared to the conventional cathode ray tube (CRT) display. However, the conventional LCD at least has the problem of dependence of brightness and contrast ratio on view angle, and the problem of gray scale inversion.

FIG. 1A is a schematic explosive view illustrating a structure of a conventional LCD panel. Referring to FIG. 1A, LCD panel 100 generally includes an upper substrate 102, a bottom substrate 104, liquid crystal molecules 106 disposed between the substrates 102 and 104, polarizers 108 and 110 disposed above the substrate 102 and under the substrate 104 respectively, and a light source 112. In general, the bottom surface of the substrate 102 and the upper surface of the substrate 104 that are adjacent to the liquid crystal molecules 106 have to be rubbed to form an alignment surface for aligning the liquid crystal molecules 106. The directions D1 and D2 are perpendicular to each other, and they represent the rubbing directions of the bottom surface of the transparent substrate 102 and the upper surface of the substrate 104. As shown in FIG. 1A, the liquid crystal molecules 106 adjacent to the bottom surface of the substrate 102 and the upper surface of the substrate 104 are aligned parallel to the directions D1 and D2 respectively. Between the substrate 102 and 104, the liquid crystal molecules 106 are aligned in directions that rotate through 90° from the bottom surface of the substrate 102 to the upper surface of the substrate 104. In addition, the directions D3 and D4 of the absorption axis of the polarizers 108 and 110 are parallel to the directions D1 and D2 respectively.

In FIG. 1A, there is no voltage difference between the substrates 102 and 104. Therefore, when an unpolarized light source 112 passes through the polarizer 110, the polarization direction of the transmitted light is perpendicular to the direction D4. Then, the polarization direction of the transmitted light will be rotated by the liquid crystal molecules 106 and will be perpendicular to the direction D1 finally. Therefore, the transmitted light may pass through the polarizer 108 since the direction D3 of the absorption axis of the polarizers 108 is parallel to the direction D1.

FIG. 1B is a schematic explosive view illustrating an operation of a conventional LCD panel. In FIG. 1B, a voltage V is applied between the substrates 102 and 104, and thus the liquid crystal molecules 106 will be aligned parallel to the direction of the electric field generated by the voltage V. Therefore, when an unpolarized light source 112 passes through the polarizer 110, the polarization direction of the transmitted light is perpendicular to the direction D4. However, the polarization direction of the transmitted light is not rotated by the liquid crystal molecules 106 and will be still perpendicular to the direction D4 finally. Therefore, the transmission light can not pass through the polarizer 108 since the directions D3 of the absorption axis of the polarizers 108 is perpendicular to the direction D4. Accordingly, the brightness of the LCD panel 100 is dependent on the voltage V.

However, as shown in FIG. 1B, it should be noted that, only a middle portion of liquid crystal molecules 106 is aligned parallel to the direction of the electric field, the liquid crystal molecules 106 that near the bottom surface of the substrate 102 and the upper surface of the substrate 104 are still influenced by the rubbing directions D1 and D2 respectively. Therefore, a light leakage may be generated and the performance such as the contrast ratio of the LCD panel 100 may be reduced.

In order to improve the problem of the conventional LCD shown in FIGS. 1A and 1B, an optical compensation film is developed. FIG. 2 is a schematic explosive view illustrating a structure of another conventional LCD. Referring to FIG. 2, except for the basic structure of the LCD panel 100, the LCD panel 200 further includes optical compensation films 212/214 disposed between the substrate 102/104 and the polarizer 108/110 respectively. The direction D5 and D6 of the absorption axis of the optical compensation films 212 and 214 are disposed the same as the directions D3 and D4. The optical compensation films 212 and 214 are provided for compensating the difference of the reflective index of the liquid crystal molecules 106 as shown in FIG. 1B. Therefore, the problem of light leakage is prevented and the performance such as the contrast ratio of the LCD panel 200 is enhanced.

However, the LCD panel 200 shown in FIG. 2 has the following disadvantages. FIG. 3A is a plot of a contrast ratio versus a viewing angle of the LCD shown in FIG. 2. FIG. 3B is a schematic diagram illustrating a definition of the coordinate system for the viewing angle. It is noted that, the viewing angle of the plot of FIG. 3A is defined in FIG. 3B, wherein the direction 312 is the observation direction of the observer, the azimuthal coordinate is defined as the angle between the X-axis (0 degree) and the projection of the direction 312 on the surface of the substrate 102 of the LCD panel 200, and the radial coordinate is defined as the angle between the direction 312 and the Z-axis (i.e., the normal of the surface of the substrate 102 of the LCD panel 200.) The X-axis and the Z-axis are also illustrated in FIG. 2. The diagram shown in FIG. 3A represents the contrast ratio of the LCD panel 200 versus the viewing angle of the direction 312, wherein the contrast ratio is defined as the ratio of the brightness of pixel in bright (without voltage between the substrates 102 and 104) to the brightness of the pixel in dark (with voltage between the substrates 102 and 104). It should be noted that, the contrast ratio of the hatched area shown in FIG. 3 is larger that 10, however, the contrast ratio of the area having an azimuthal coordinate is close to 270° is less than 10.

FIG. 4 is a plot illustrating a gray scale inversion phenomenon of the LCD shown in FIG. 2. As shown FIG. 4, it is noted that as the azimuthal coordinate is close to 90° or 270°, the gray scale inversion phenomenon is very serious since the gray scale of the marked areas 404, 404 shown in FIG. 4 varies many times.

FIG. 5 is a diagram illustrating an observer and the LCD shown in FIG. 2. Referring to FIG. 5, the image displayed by the LCD 200 shown in FIG. 2 has a polarization direction D7 perpendicular to the direction D3. However, when the observer wears a pair of sunglasses 502, only a portion of the image having a polarization direction perpendicular to D8 may be observed since the conventional sunglasses 502 generally has an absorption axis with a direction D8 for filtering the sunlight. Therefore, the observed brightness of the image displayed by the LCD 200 may be reduced drastically.

Accordingly, an LCD for improving the low contrast ratio as the azimuthal coordinate is close to 270°, reducing the gray scale inversion problem and avoiding the reduction of brightness when a user views the LCD through a pair of polarized sunglasses is highly desirable.

SUMMARY OF THE INVENTION

Therefore, the present invention is related to an LCD panel, a display device and an electronic device for improving the low contrast ratio as the azimuthal coordinate is close to 270°, reducing the gray scale inversion problem and avoiding the reduction of brightness when a user views the LCD panel through a pair of polarized sunglasses.

According to one embodiment of the present invention, the display panel comprises a first substrate, a second substrate parallel and opposite to the first substrate, a liquid crystal molecules disposed between the first substrate and the second substrate, a first polarizer disposed over the first substrate, and a second polarizer disposed over the second substrate. The first substrate comprises a first alignment surface in a first alignment direction, and the second substrate comprises a second alignment surface in a second alignment direction. The liquid crystal molecules are disposed between the first alignment surface and the second alignment surface. The first polarizer comprises a first absorption axis and the second polarizer comprises a second absorption axis. The angle between the first absorption axis and the first alignment direction as well as an angle between the second absorption axis and the second alignment direction are in a range of about 45°±10° respectively.

In one embodiment of the present invention, the display panel further comprises a first optical compensation film disposed between the first substrate and the first polarizer, and a second optical compensation film disposed between the second substrate and the second polarizer. The first and the second optical compensation film comprise a first and a second optical axis respectively. In addition, the first optical axis and the first alignment direction as well as the second optical axis and the second alignment direction are in almost parallel.

Accordingly, in the present invention, since the direction of the absorption axis of the polarizer of the LCD panel is not substantially parallel to the direction of the rubbing of the alignment surface of the substrates of the LCD panel, the problem of the low contrast ratio as the azimuthal coordinate is close to 270°, the problem of the gray scale inversion and the reduction of brightness when a user wears such as a sunglasses are improved drastically.

In accordance with another aspect of the present invention, an additional compensation film is provided between a first compensation film and a polarizer. In one embodiment, the slow axis of the additional compensation film lies between the adsorption axis of the polarizer and the first compensation film. In another embodiment, the angle between the slow axis of the additional compensation film and the adsorption axis of the polarizer is about 90°±10°.

One or part or all of these and other features and advantages of the present invention will become readily apparent to those skilled in this art from the following description wherein there is shown and described one embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
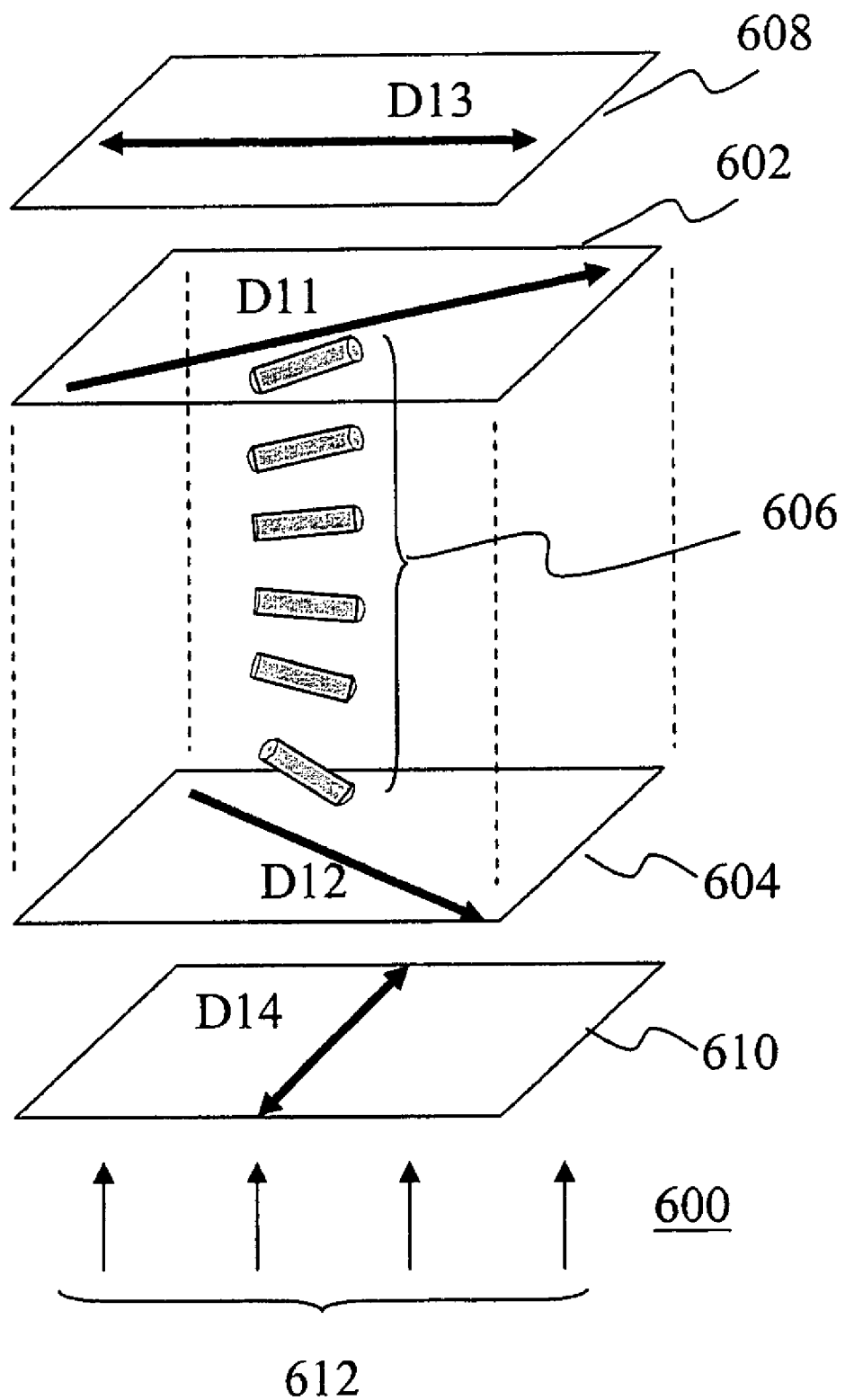
FIG. 6 is a schematic explosive view of a structure of an LCD according to one embodiment of the present invention.

FIG. 6 is a schematic explosive view of a structure of an LCD according to one embodiment of the present invention. Referring to FIG. 6, an LCD panel 600 may comprises an upper substrate 602, a bottom transparent substrate 604, liquid crystal molecules 606 disposed between the substrates 602 and 604, polarizers 608 and 610 disposed above the substrate 602 and under the substrate 604 respectively, and a light source 612. The light source may be, for example, a backlight source illuminates the LCD panel 600 from the bottom side of the substrate 604 as illustrated in FIG. 6, or a front-light source illuminates the LCD panel 600 from the upper side of the substrate 602 (not shown).

In one embodiment of the present invention, the bottom surface of the substrate 602 and the upper surface of the substrate 604 that close to the liquid crystal molecules 606 may be rubbed to form an alignment surface for aligning the liquid crystal molecules 606. The directions D11 and D12 are the rubbing directions of the bottom surface of the substrate 602 and the upper surface of the substrate 604 respectively. As shown in FIG. 6, the liquid crystal molecules 606 adjacent to the bottom surface of the transparent substrate 602 and the upper surface of the substrate 604 are aligned parallel to the directions D11 and D12 respectively. In one embodiment of the present invention, the angle between the directions D11 and D12 is in a range of about 90°±10°, or in a range of about 90°±5°. Between the substrates 602 and 604, the liquid crystal molecules 606 are aligned in directions that rotate through about 90°±10° or 90°±5° from the bottom surface of the substrate 602 to the upper surface of the substrate 604. In one embodiment of the present invention, the angles between the directions D13/D14 of the absorption axis of the polarizers 608/610 and the directions D11/D12 are in a range of about 45°±10° respectively, or in a range of about 45°±5° respectively. It should be noted that, the directions D13 and D14 of the absorption axis of the polarizers 608 and 610 shown in FIG. 6 are only illustrated for example and can not be used to limit the scope of the invention.

Figure 7A:
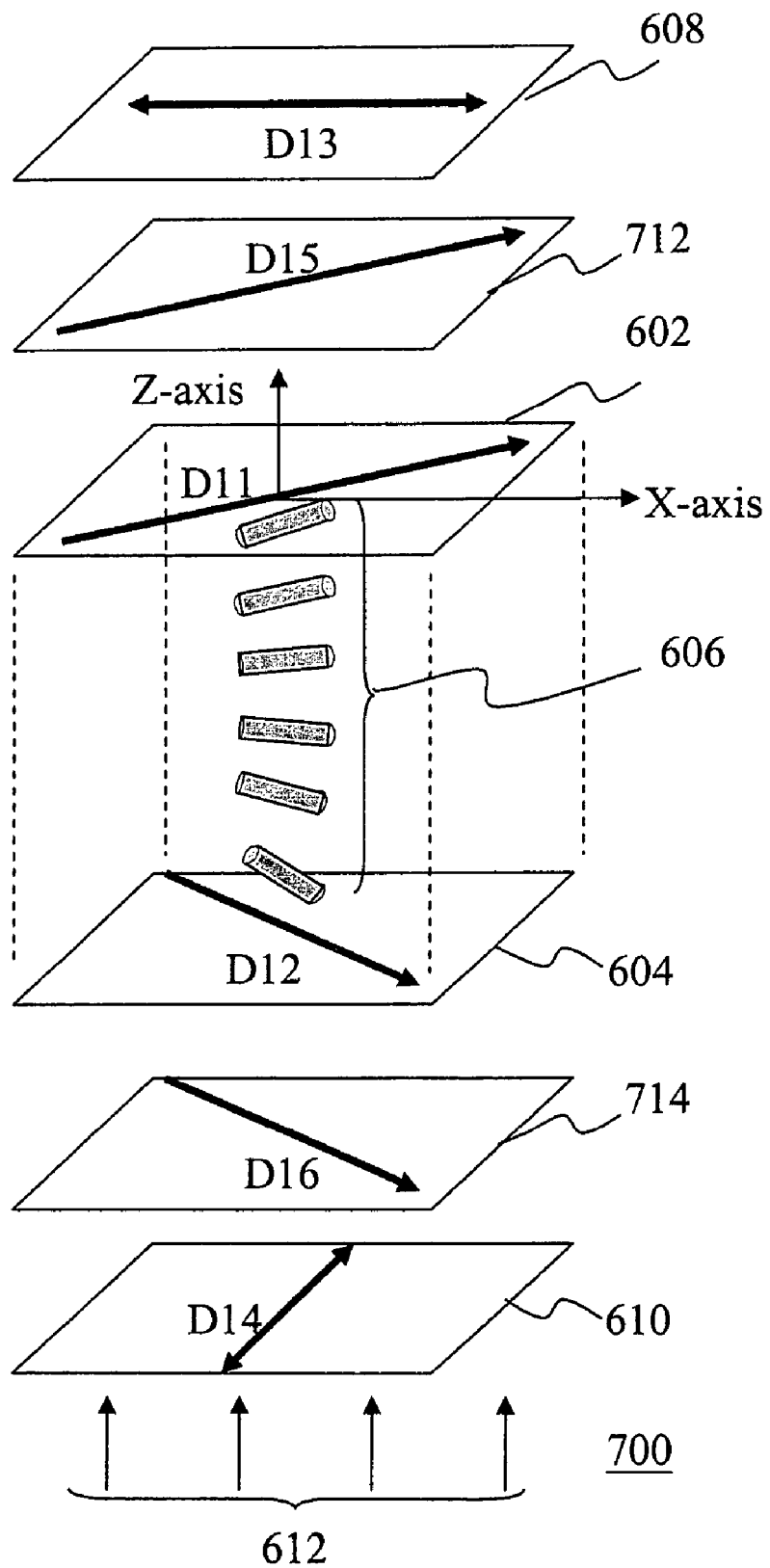
FIG. 7A is a schematic explosive view of a structure of an LCD according to one embodiment of the present invention.

In another embodiment of the present invention, a first optical compensation film (such as quarter wave plate or half wave plate) may also be adopted for the LCD panel. FIG. 7A is a schematic explosive view of a structure of an LCD according to one embodiment of the present invention. Referring to FIG. 7A, except for the basic structure of the LCD panel 600, the LCD panel 700 further comprises first/second optical compensation films 712/714 disposed between the substrates 602/604 and the polarizers 608/610 respectively. The angles between the directions D15/D16 of the absorption axis of the optical first/second compensation films 712/714 and the directions D11/D12 may be in a range of about 0~10° respectively, or in a range of about 0~5° respectively. The first and second optical compensation films 712 and 714 are adopted for compensating the difference of the reflective index of the liquid crystal molecules 606 as shown in FIG. 6. In one embodiment of the present invention, the sign of the difference of the double refractive index of the liquid crystal molecules 606 is different from the sign of the difference of the double refractive index of the first and second optical compensation films 712 and 714. Therefore, the problem of light leakage is prevented and the performance such as the contrast ratio of the LCD panel 700 is enhanced.

Figure 3A:
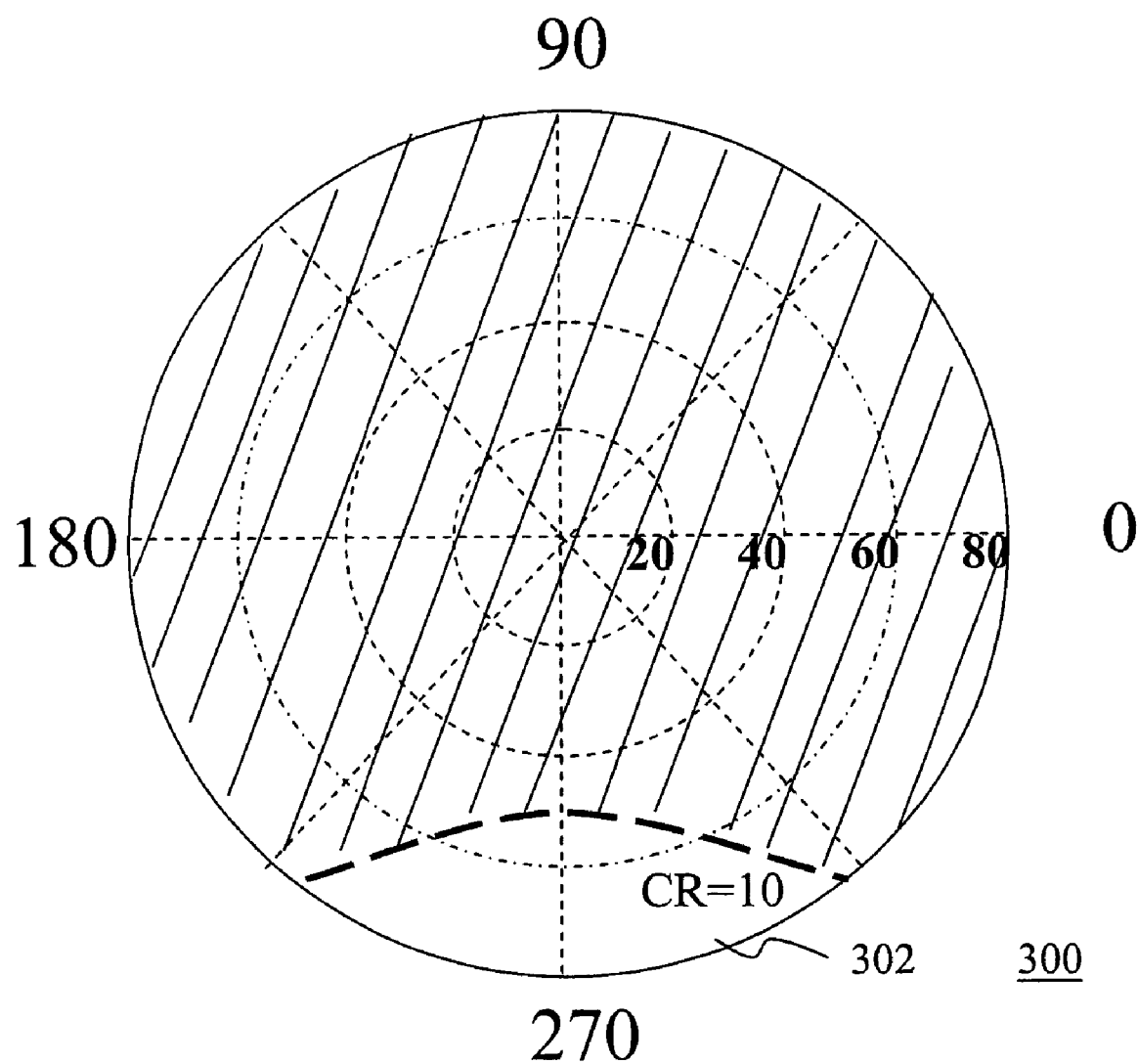
FIG. 3A is a plot of a contrast ratio versus a viewing angle of the LCD shown in FIG. 2.
Figure 3B:
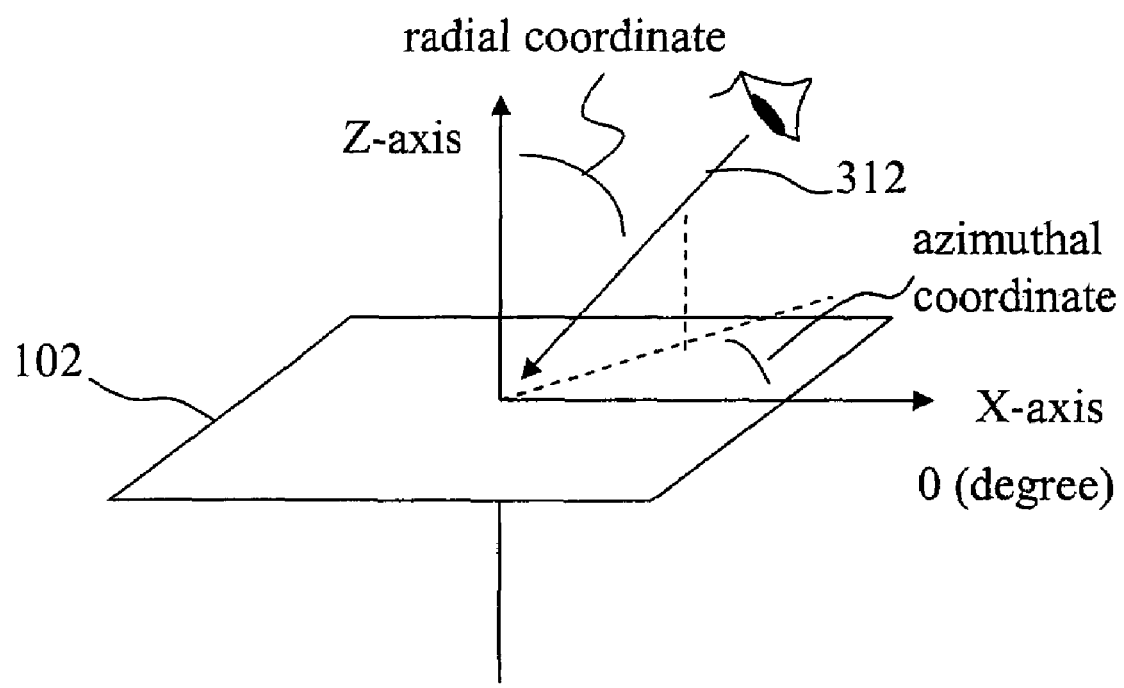
FIG. 3B is a schematic diagram illustrating a definition of the coordinate system for the viewing angle.
Figure 8A:
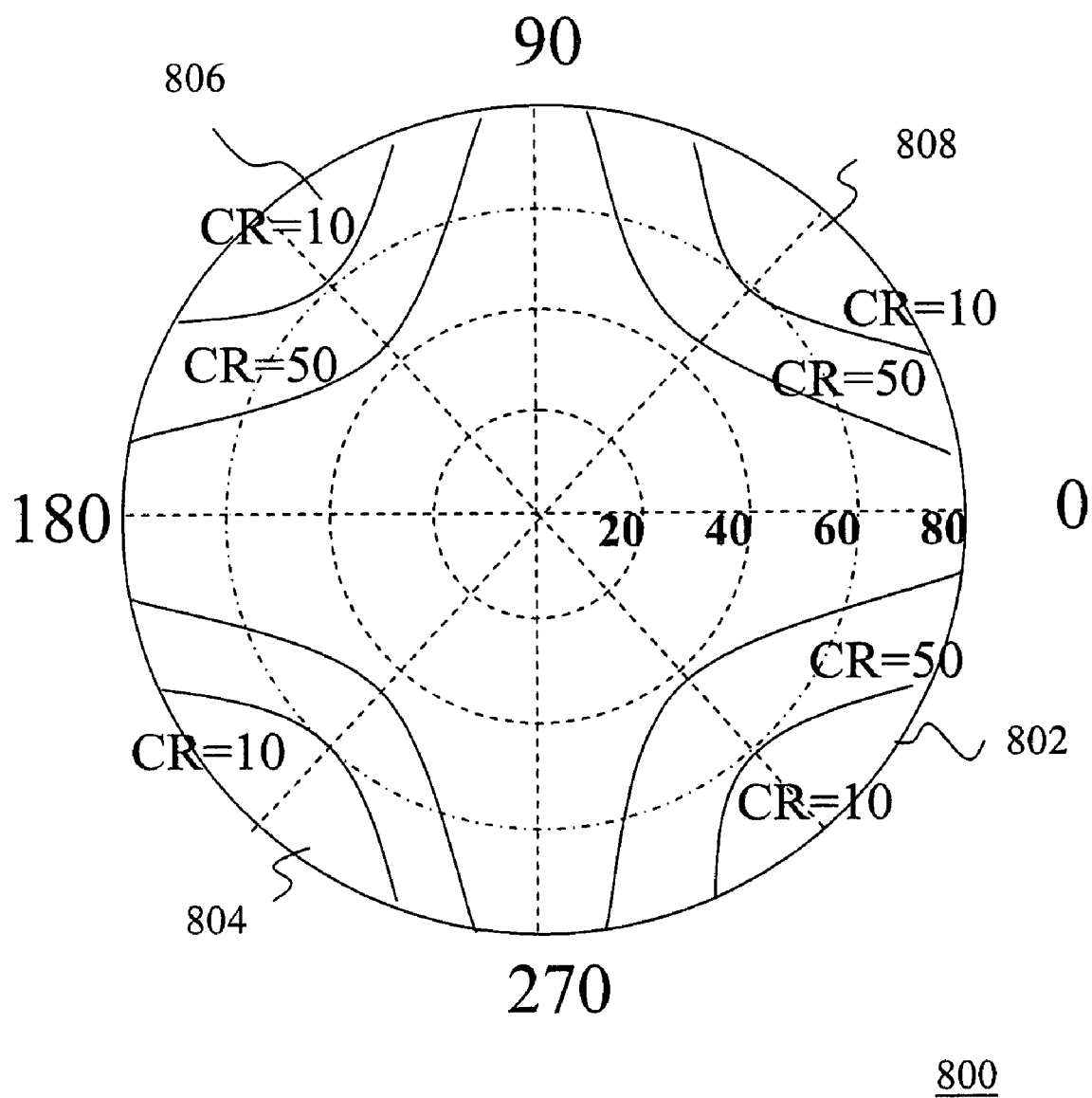
FIG. 8A is a plot of a contrast ratio versus a viewing angle of the LCD shown in FIG. 7A according to one embodiment of the present invention.

FIG. 8A is a plot of a contrast ratio versus a viewing angle of the LCD shown in FIG. 7A according to one embodiment of the present invention. FIG. 8A represents the contrast ratio of the LCD panel 700 versus the viewing angle (as the direction 312 based on the coordinate axis defined in reference to FIG. 3B), wherein the X-axis and the Z-axis are also illustrated in FIG. 7A. The contrast ratio is defined as the ratio of the brightness of pixel in bright (without voltage between the substrates 602 and 604) to the brightness of the pixel in dark (with voltage between the substrates 602 and 604). It should be noted that, the problem that the region at the azimuthal coordinate close to 270° having a contrast ratio less than 10 of the conventional LCD shown in FIG. 3A is eliminated. In addition, the four regions 802, 804, 806, 808 having a contrast ratio less than 10 as shown in FIG. 8A is smaller than the region shown in FIG. 3.

Figure 1A:
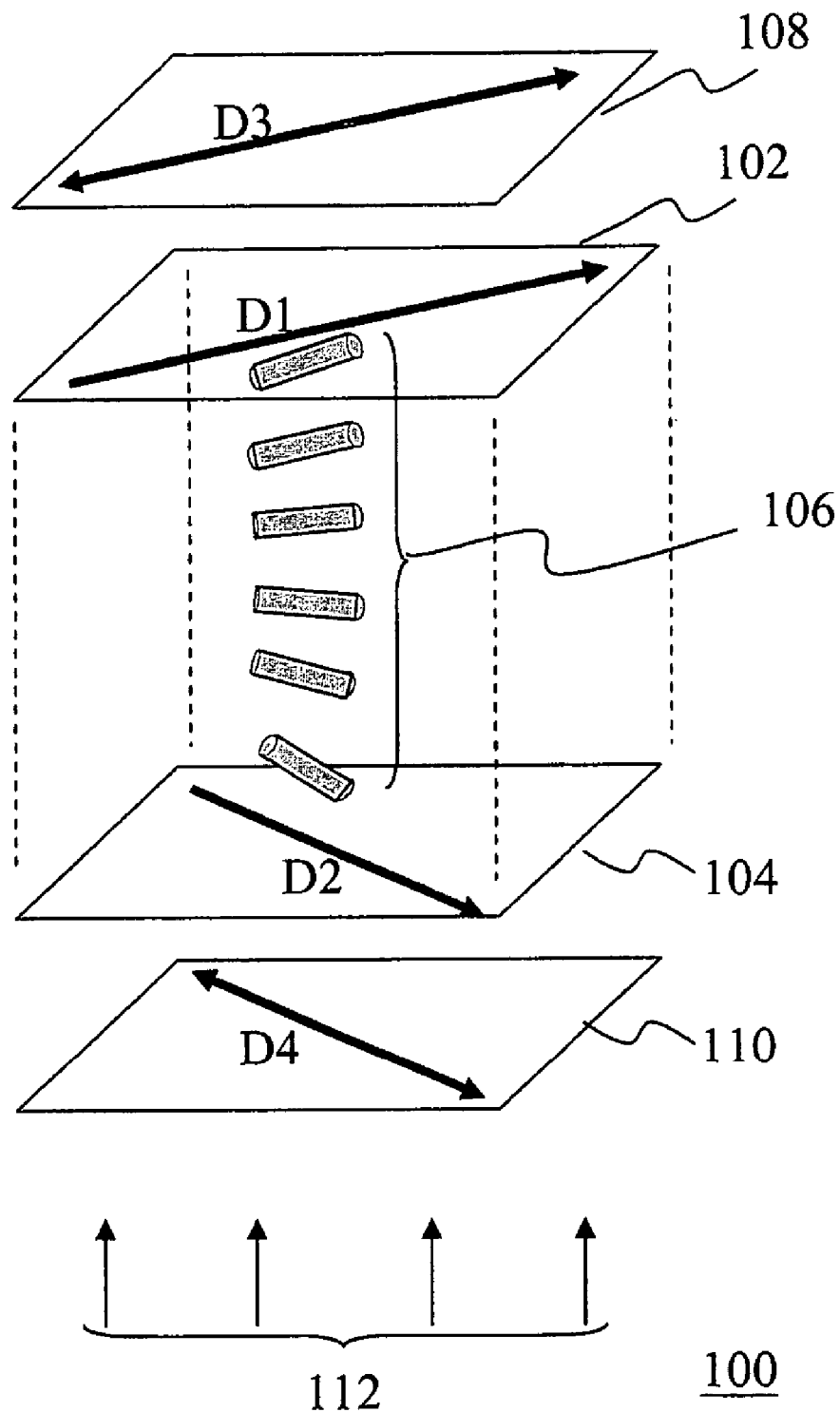
FIG. 1A is a schematic explosive view illustrating a structure of a conventional LCD panel.
Figure 1B:
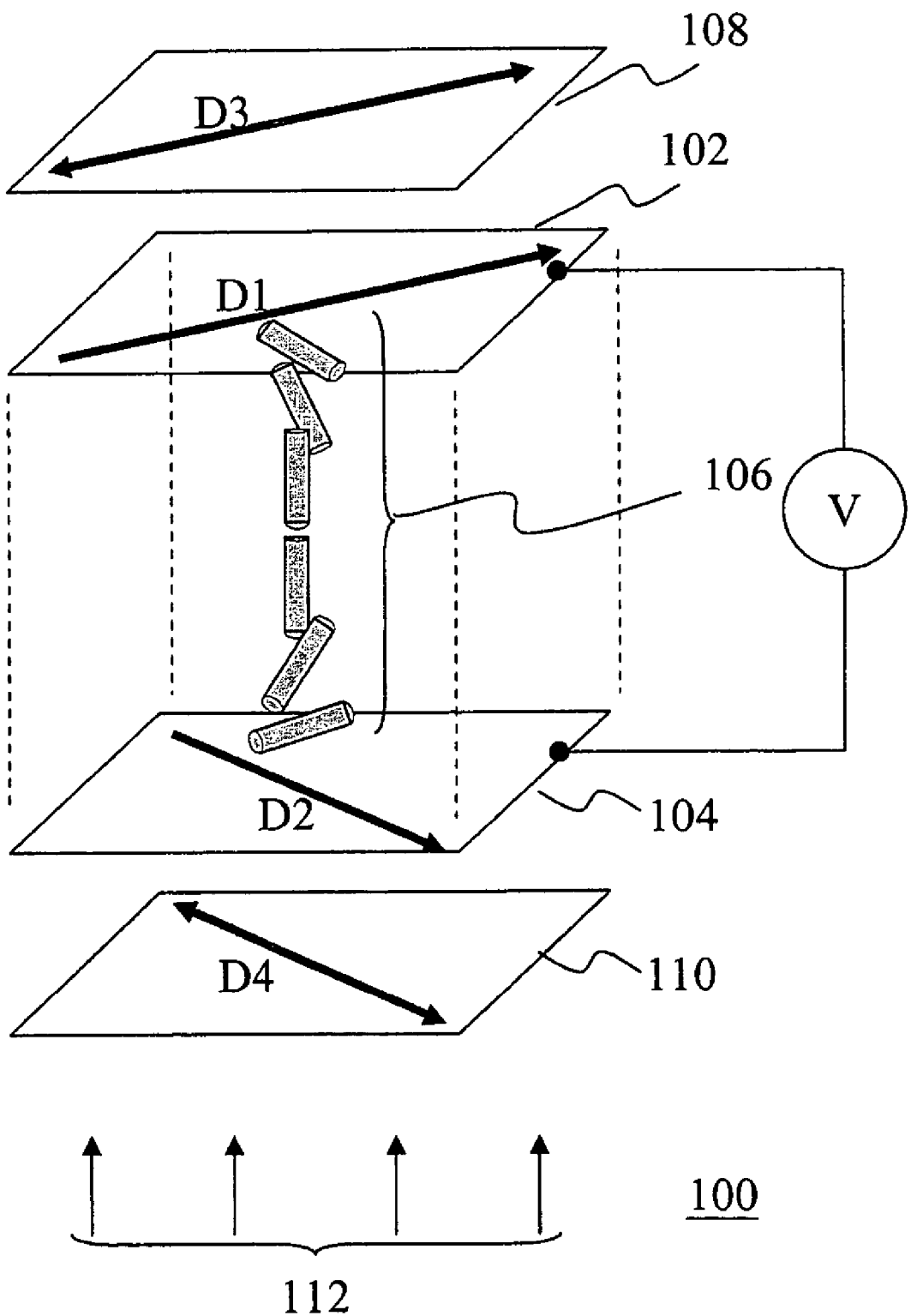
FIG. 1B is a schematic explosive view illustrating an operation of a conventional LCD panel.
Figure 2:
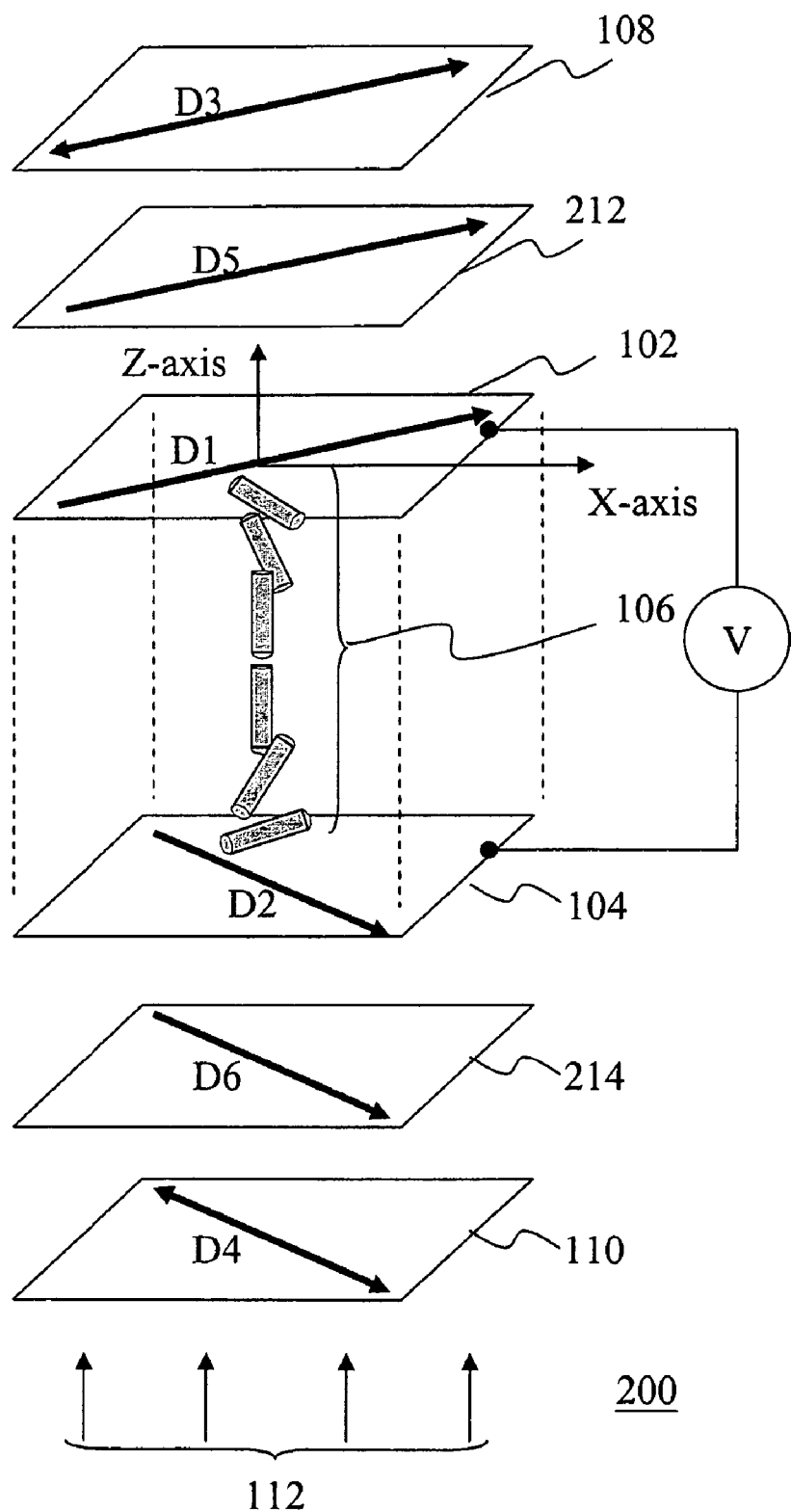
FIG. 2 is a schematic explosive view illustrating a structure of another conventional LCD.
Figure 9A:
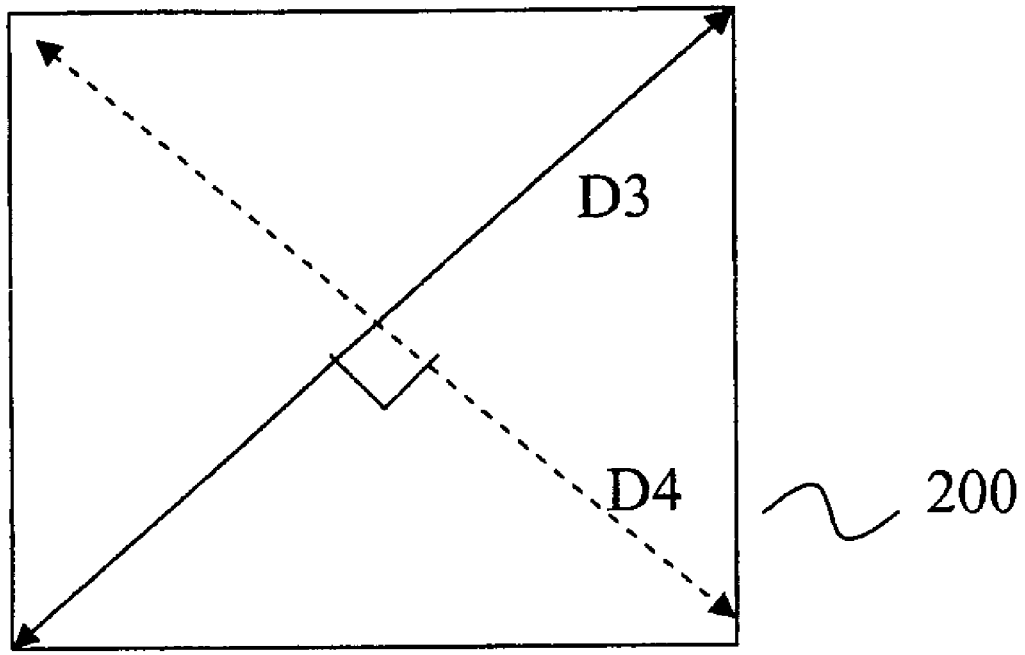
FIGS. 9A-9B are schematic views illustrating a difference between the observation of a conventional LCD panel.
Figure 9B:
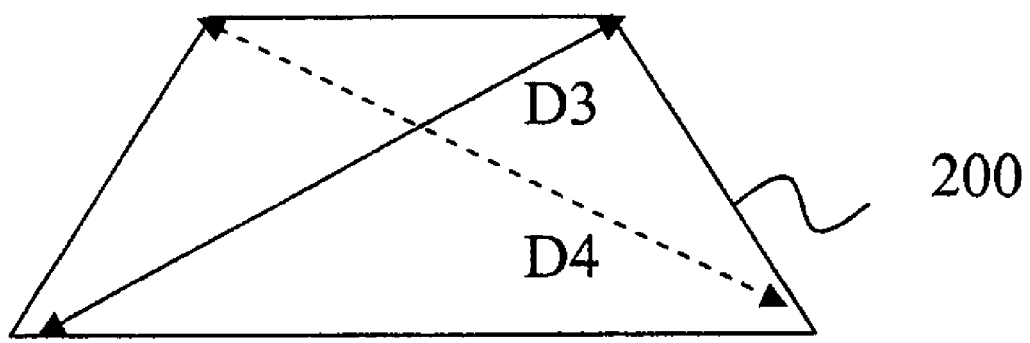

FIGS. 9A-9B are schematic views illustrating a difference between the observation of a conventional LCD panel. Referring to FIG. 9A, when the LCD panel 200 shown in FIG. 2 is observed at an azimuthal coordinate equals to 0°, the observed directions D3 and D4 of the polarizers 108 and 110 are mutually perpendicular. However, in FIG. 9B, when the LCD panel 200 shown in FIG. 2 is observed at an azimuthal coordinate close to 270° and at a radial coordinate close to, e.g., 70°, the observed directions D3 and D4 of the polarizers 108 and 110 are not mutually perpendicular. Therefore, a light leakage may be generated as the LCD panel 200 is observed from the view angle shown in FIG. 9B, and thus the region 302 with a contrast ratio less than 10 is generated.

Figure 9C:
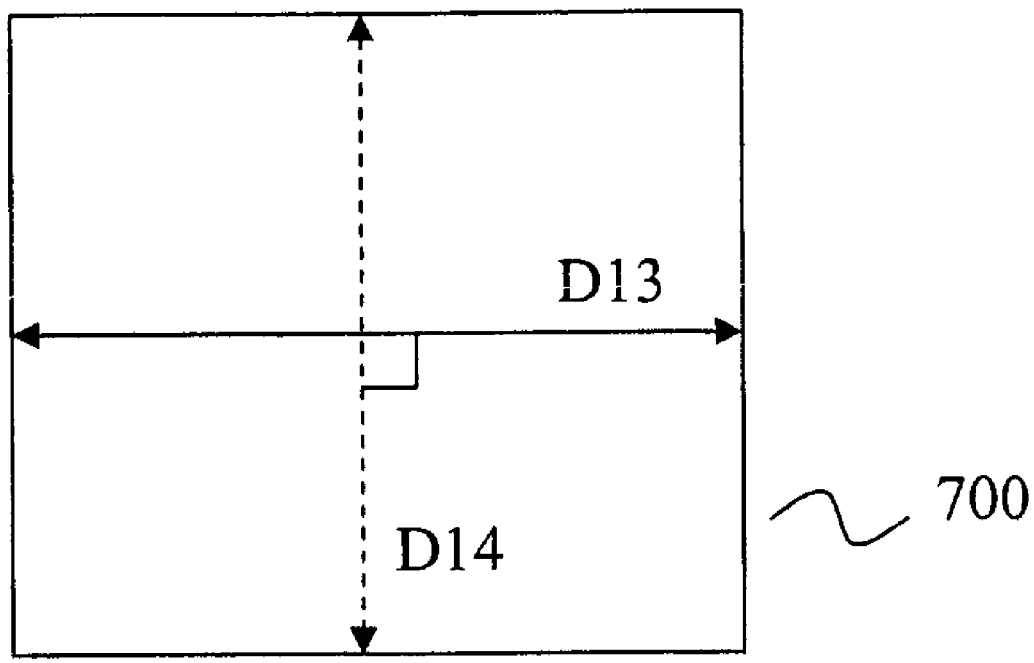
FIGS. 9C-9D are schematic views illustrating a difference between the observation of an LCD according to one embodiment of the present invention.
Figure 9D:
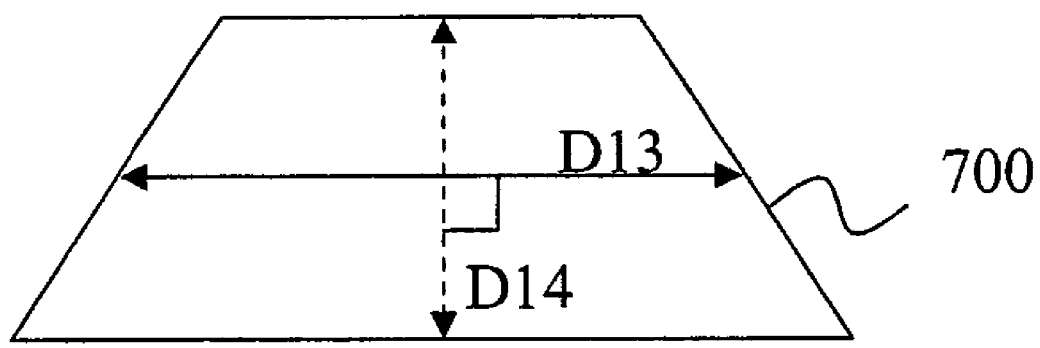

FIGS. 9C-9D are schematic views illustrating a difference between the observation of an LCD according to one embodiment of the present invention. Referring to FIG. 9C, when the LCD panel 600 or 700 shown in FIG. 6 or FIG. 7A is observed at an azimuthal coordinate equals to 0°, the observed directions D13 and D14 of the polarizers 608 and 610 are mutually perpendicular. However, in FIG. 9D, when the LCD panel 600 or 700 shown in FIG. 6 or FIG. 7A is observed at an azimuthal coordinate close to 270° and at a radial coordinate close to, e.g., 70°, the observed directions D13 and D14 of the polarizers 608 and 610 are still mutually perpendicular. Therefore, the region 302 with a contrast ratio less than 10 in the conventional LCD panel 200 is eliminated.

Figure 4:
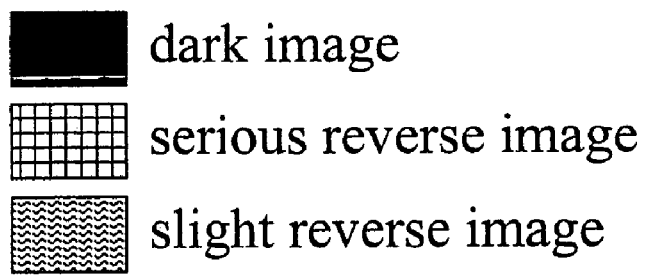
FIG. 4 is a plot illustrating a distribution of the inversion phenomenon of the LCD shown in FIG. 2.
Figure 4:
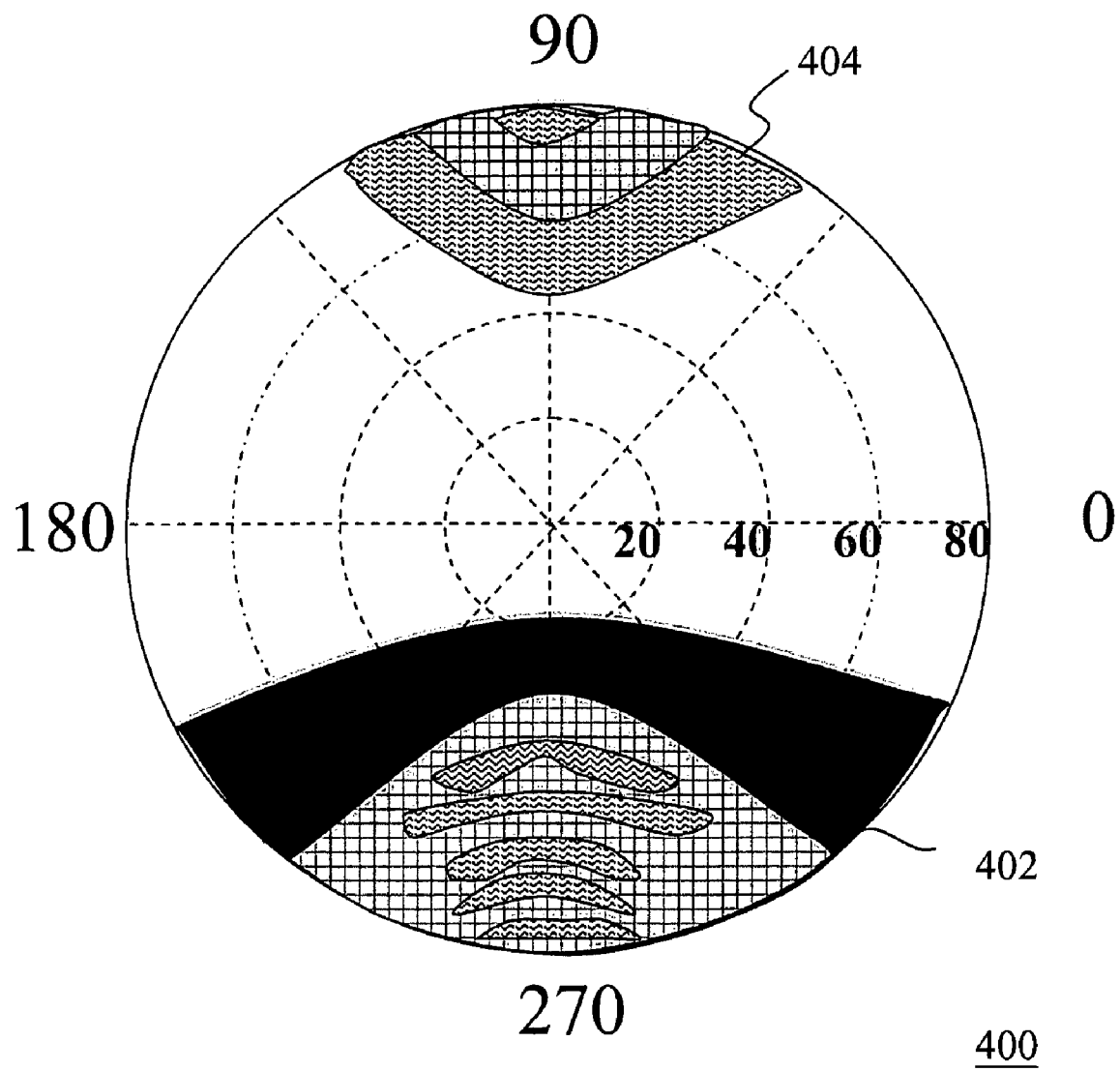
Figure 5:
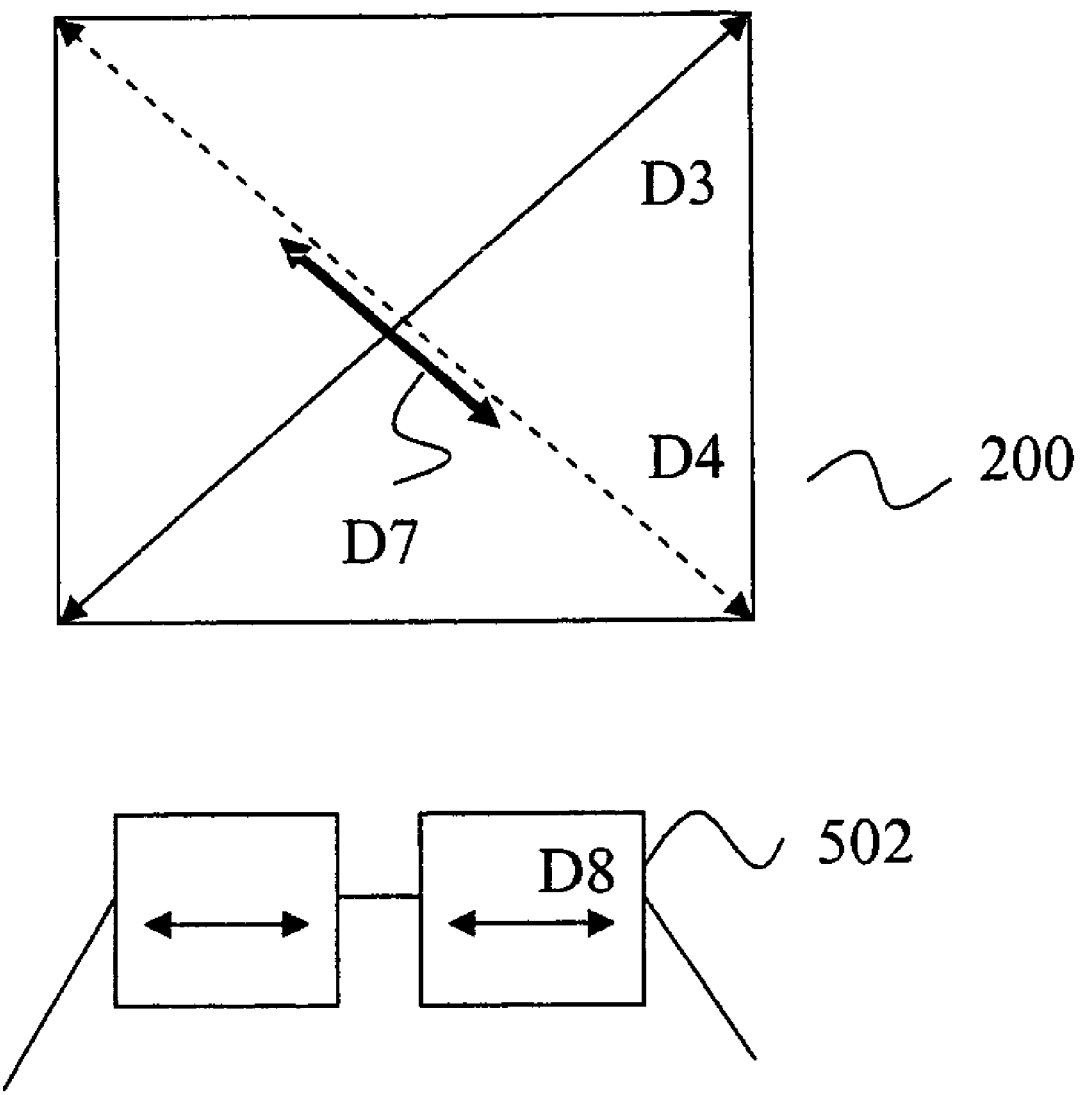
FIG. 5 is a diagram illustrating an observer and the LCD shown in FIG. 2.
Figure 10A:
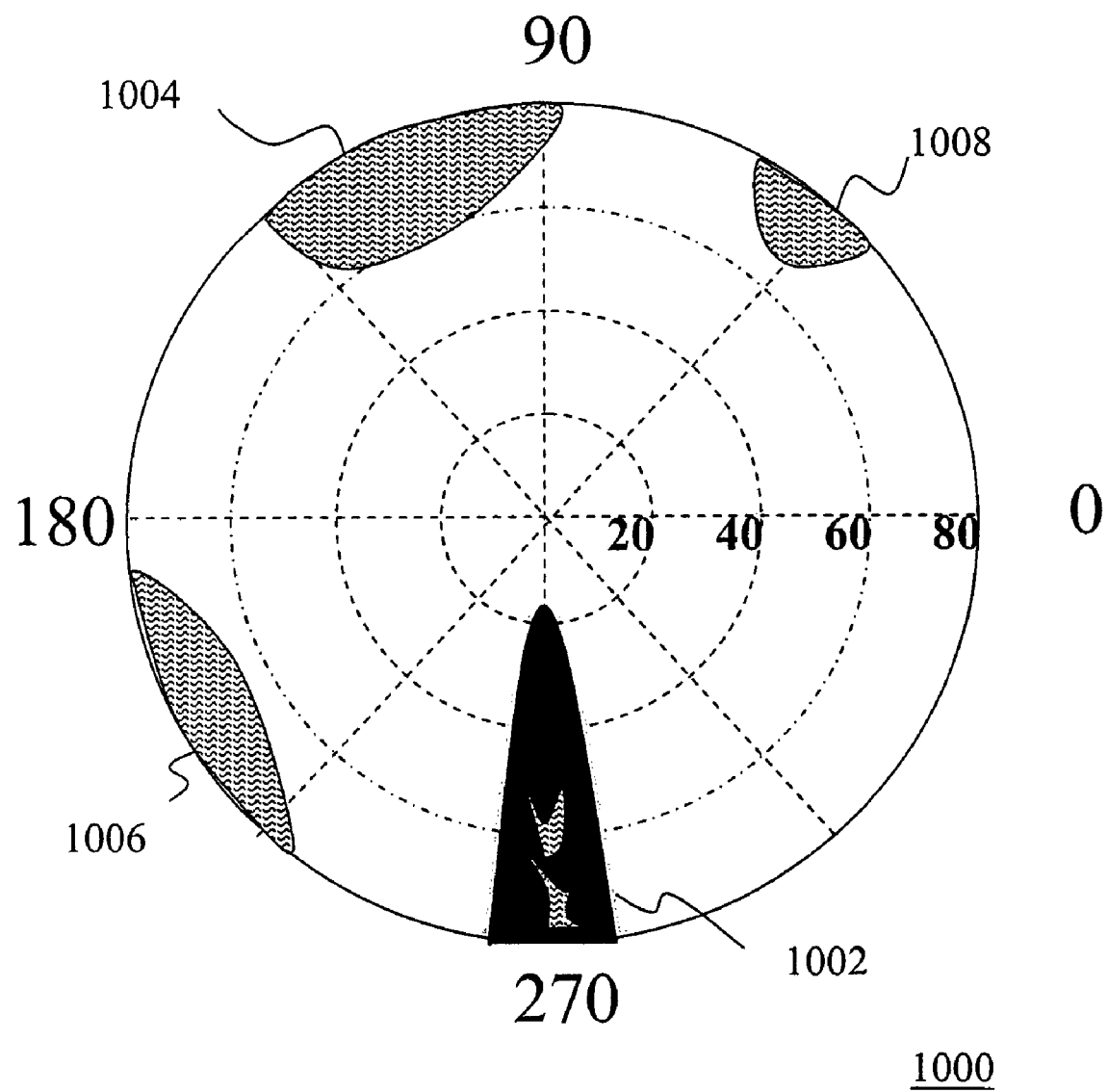
FIG. 10A is a plot illustrating a gray scale inversion phenomenon of the LCD according to one embodiment of the present invention.

FIG. 10A is a plot illustrating a gray scale inversion phenomenon of the LCD according to one embodiment of the present invention. It is noted that, the serious problem of the gray scale inversion phenomenon of the plot shown in FIG. 4 at the azimuthal coordinate is close to 90° or 270° is improved in the plot shown in FIG. 10A. Especially, the problem that the gray scale inverts many times along the azimuthal coordinate 90° or 270° as shown in FIG. 4 is eliminated since the gray scale only inverts at most two times along the azimuthal coordinate 270° as shown in FIG. 10A. In other words, the gray scale inversion phenomenon occurred in regions 1002, 1004, 1006, 1008 may also be improved in the present invention.

The following illustrations are alternative embodiments of the present invention. All descriptions discussed above are incorporated herein by reference.

Figure 7B:
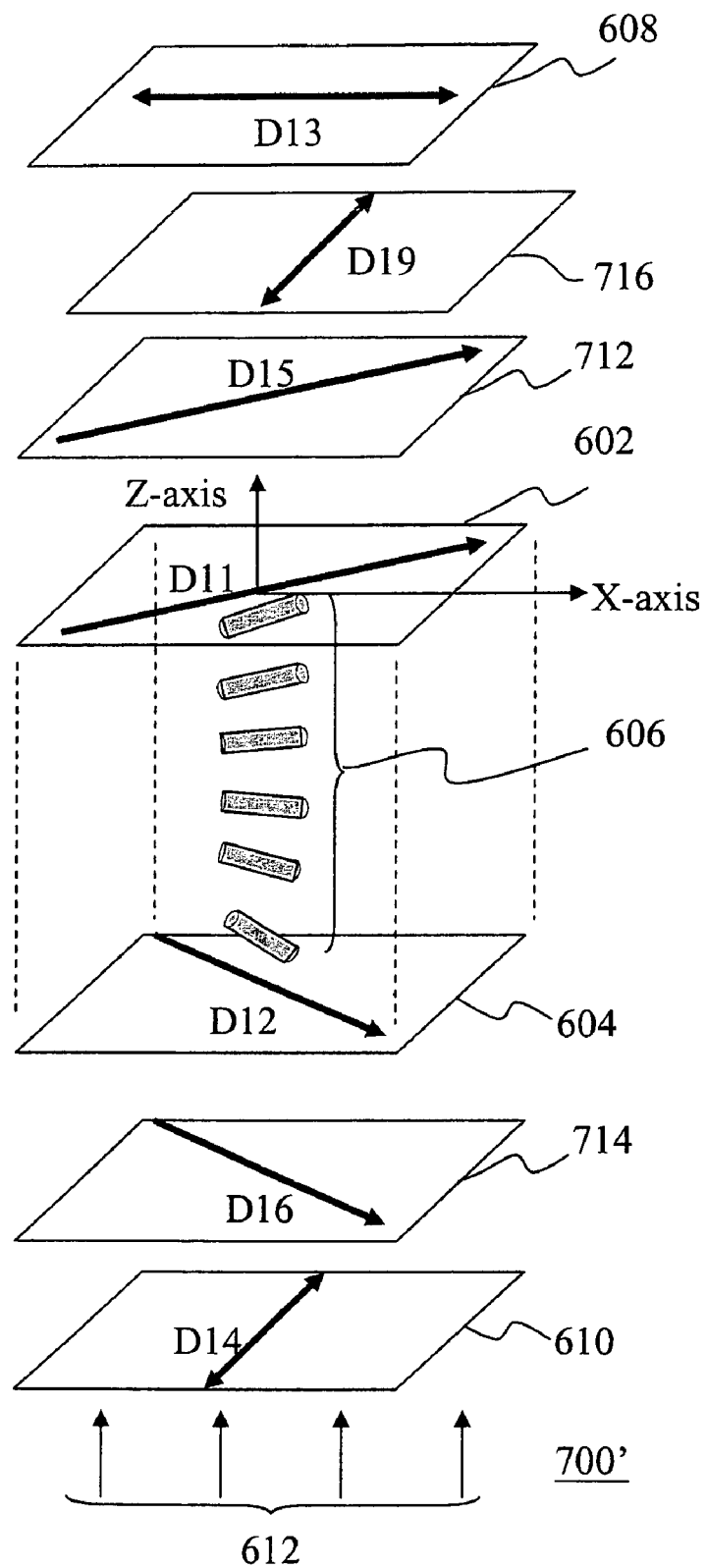
FIG. 7B is a schematic explosive view of a structure of an LCD according to another embodiment of the present invention.
Figure 8B:
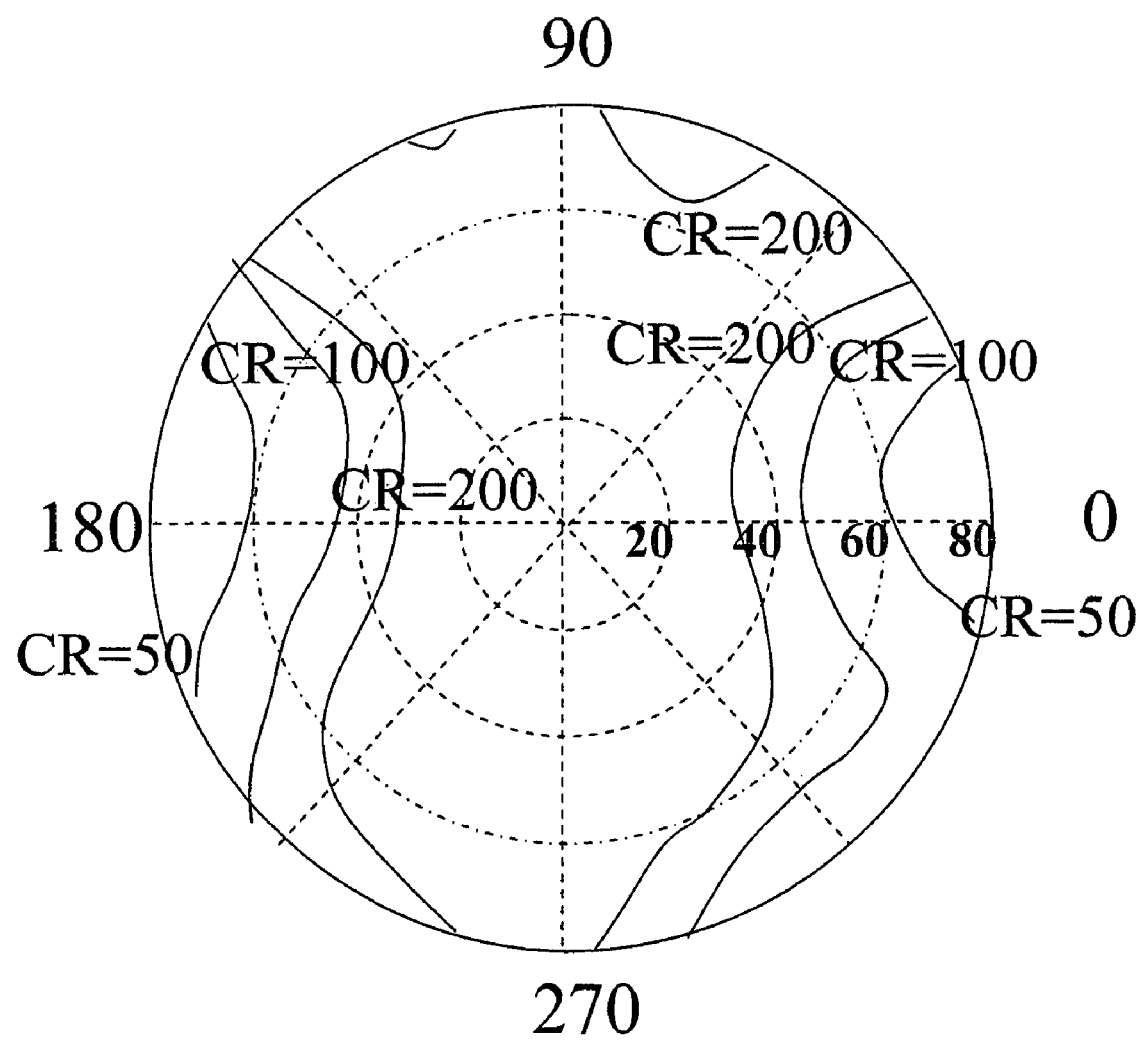
FIG. 8B is a plot of a contrast ratio versus a viewing angle of the LCD shown in FIG. 7B according to one embodiment of the present invention.
Figure 10B:
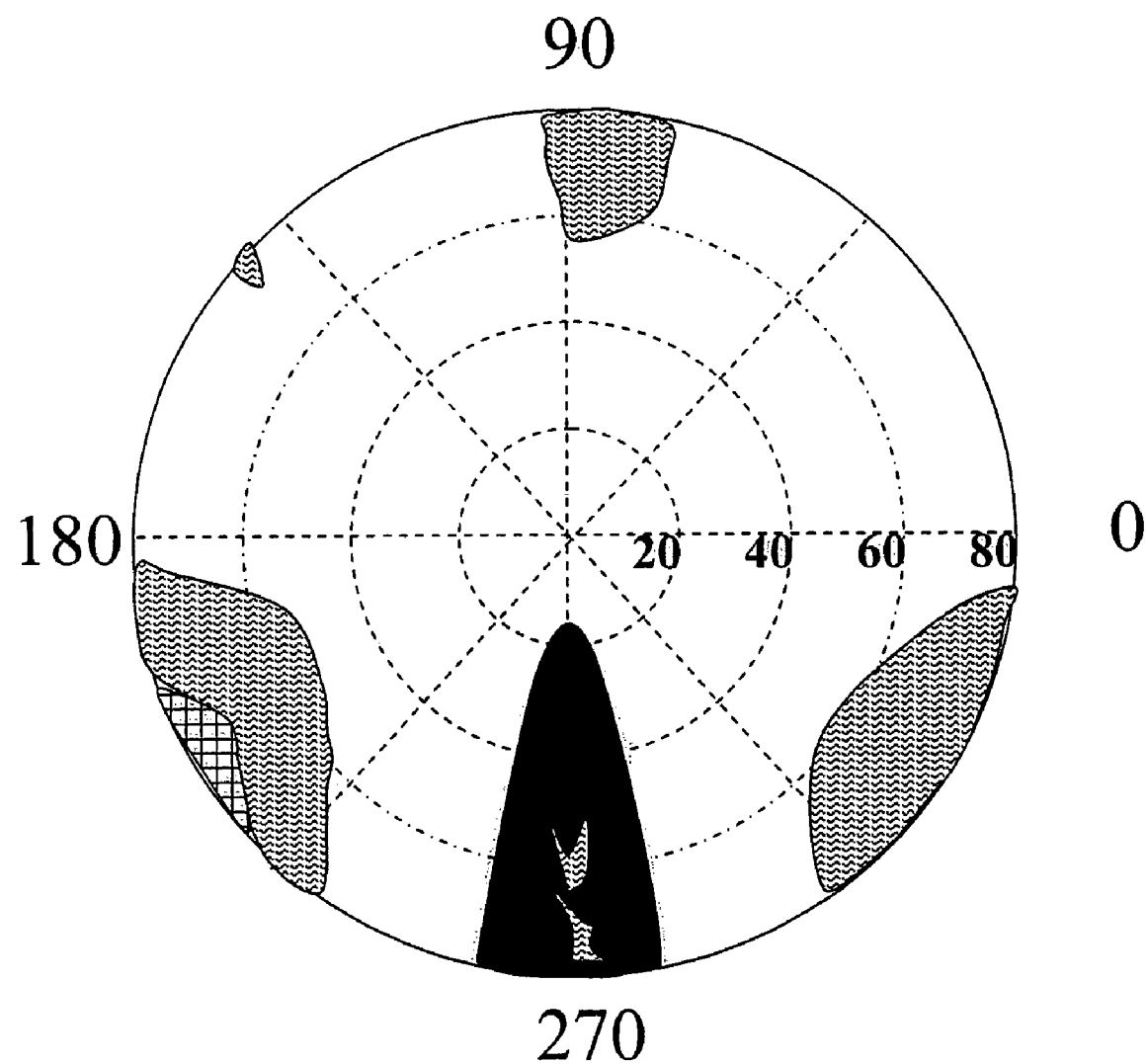
FIG. 10B is a plot illustrating a gray scale inversion phenomenon of the LCD according to another embodiment of the present invention.

FIG. 7B is a schematic explosive view of a structure of an LCD according to another embodiment of the present invention; FIG. 8B is a plot of a contrast ratio versus a viewing angle of the LCD shown in FIG. 7B according to one embodiment of the present invention; and FIG. 10B is a plot illustrating a gray scale inversion phenomenon of the LCD according to another embodiment of the present invention. Referring to FIG. 7B, FIG. 8B and FIG. 10B, except for the basic structure of the LCD panel 700, the LCD panel 700' further comprises a third optical compensation film 716. The third optical compensation film 716 has character of refractive index satisfying a relation nx=nz≠ny or ny=nz≠nx, wherein nx and ny are in-plane main refractive indices and nz is a thickness-wise refractive index. The third optical compensation film 716 is disposed between the first optical compensation films 712 and the polarizer 608. The angles between the directions D19 of the slow axis of the third optical compensation film 716 and the directions D15 may be in a range of about 45°±10°, or in a range of about 45°±5°, in a manner that the angles between the directions D19 of the slow axis of the third optical compensation film 716 and the directions D13 may be in a range of about 90°±10°, or in a range of about 90°±5°. In the present embodiment, the problem of light leakage is prevented and the performance such as the contrast ratio of the LCD panel 700' is further enhanced (shown in FIG. 8B and FIG. 10B).

Figure 7C:
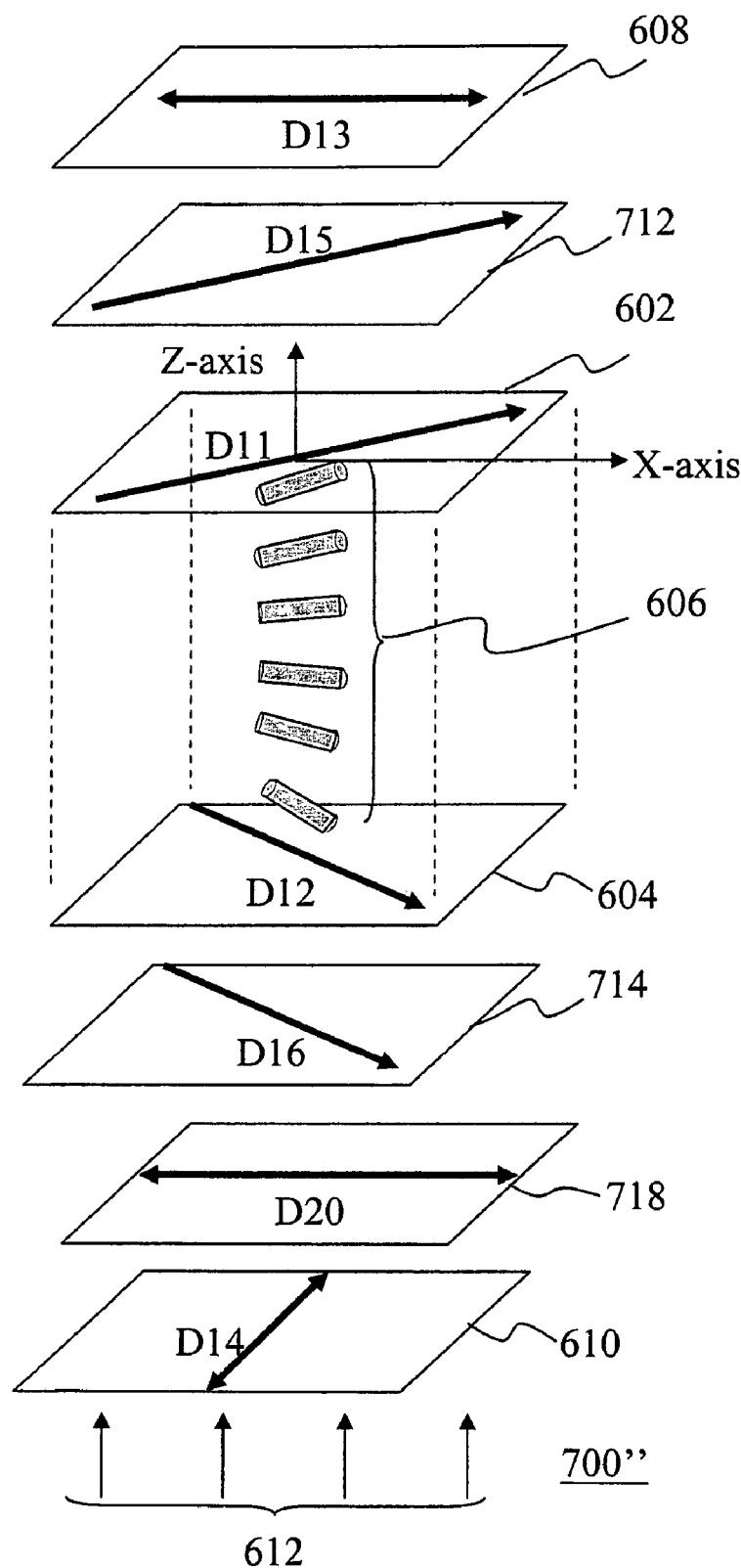
FIG. 7C is a schematic explosive view of a structure of an LCD according to still another embodiment of the present invention.
Figure 8C:
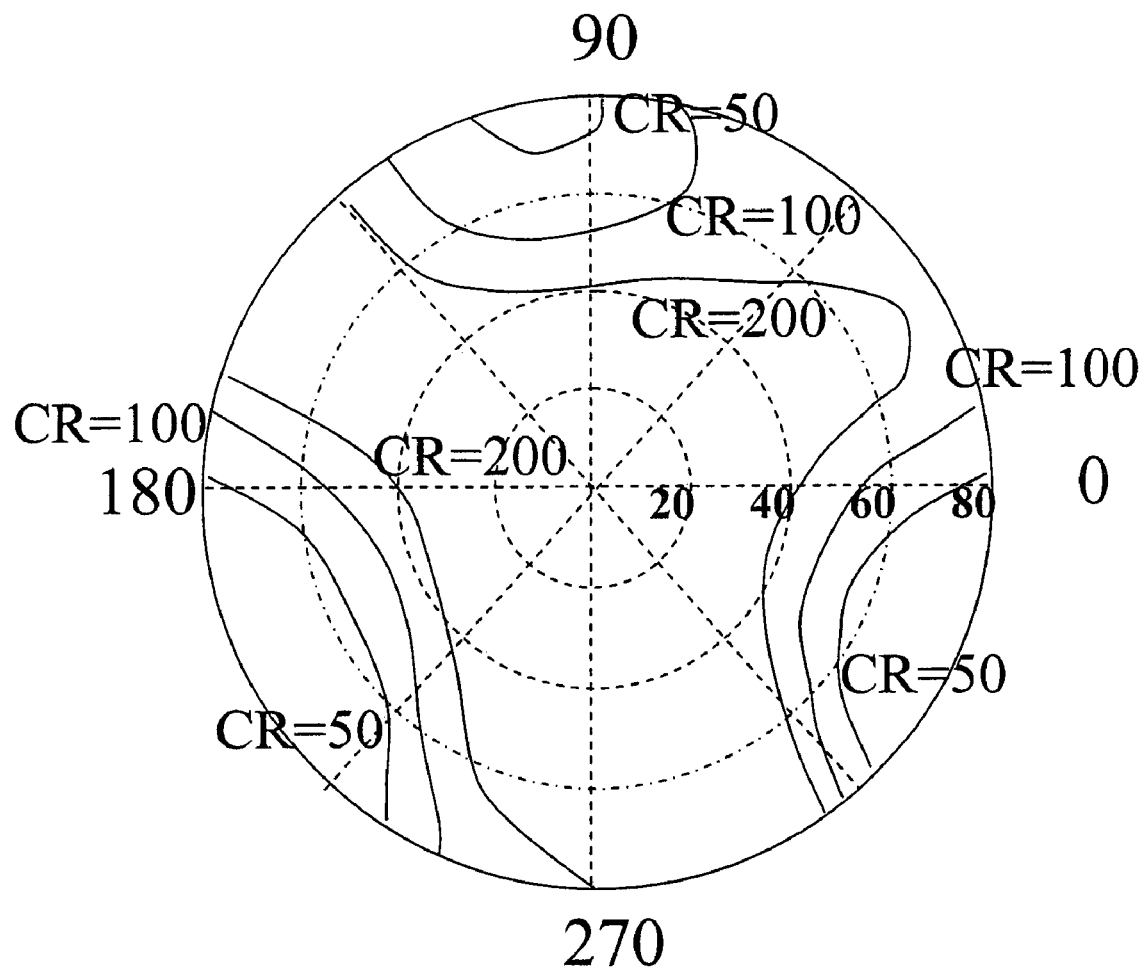
FIG. 8C is a plot of a contrast ratio versus a viewing angle of the LCD shown in FIG. 7C according to one embodiment of the present invention.
Figure 10C:
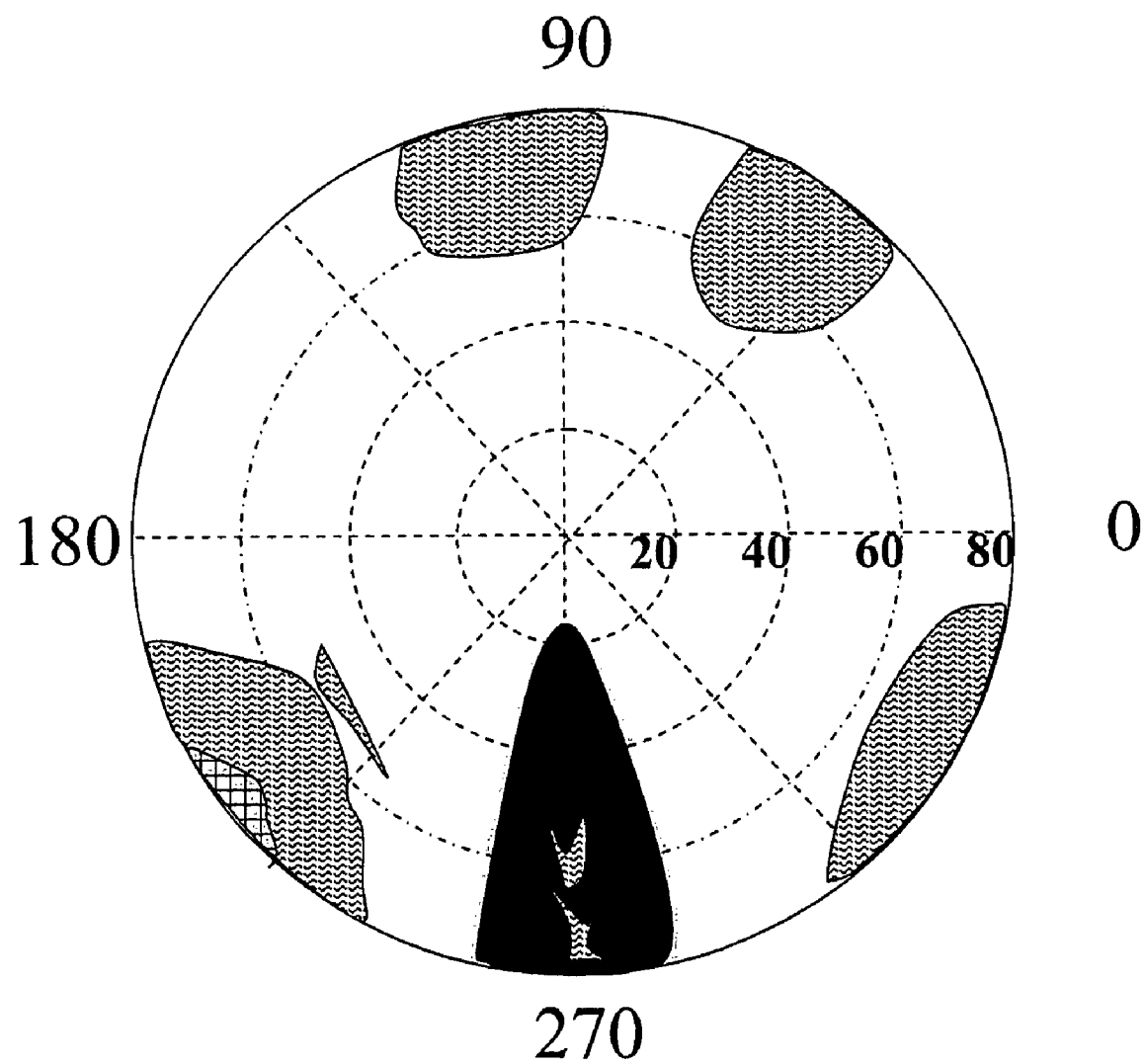
FIG. 10C is a plot illustrating a gray scale inversion phenomenon of the LCD according to still another embodiment of the present invention.

FIG. 7C is a schematic explosive view of a structure of an LCD according to still another embodiment of the present invention; FIG. 8C is a plot of a contrast ratio versus a viewing angle of the LCD shown in FIG. 7C according to one embodiment of the present invention; and FIG. 10C is a plot illustrating a gray scale inversion phenomenon of the LCD according to still another embodiment of the present invention. Referring to FIG. 7C, FIG. 8C and FIG. 10C, except for the basic structure of the LCD panel 700, the LCD panel 700" further comprises a fourth optical compensation film 718. The fourth optical compensation film 718 has character of refractive index satisfying a relation nx=nz≠ny or ny=nz≠nx, wherein nx and ny are in-plane main refractive indices and nz is a thickness-wise refractive index. The fourth optical compensation film 718 disposed between the second optical compensation films 714 and the polarizer 610. The angles between the directions D20 of the slow axis of the fourth optical compensation film 718 and the directions D16 may be in a range of about 45°±10°, or in a range of about 45°±5°, in a manner that the angles between the directions D20 of the slow axis of the fourth optical compensation film 718 and the directions D14 may be in a range of about 90°±10°, or in a range of about 90°±5°. In the present embodiment, the problem of light leakage is also prevented and the performance such as the contrast ratio of the LCD panel 700" is further enhanced (shown in FIG. 8C and FIG. 10C).

Figure 11:
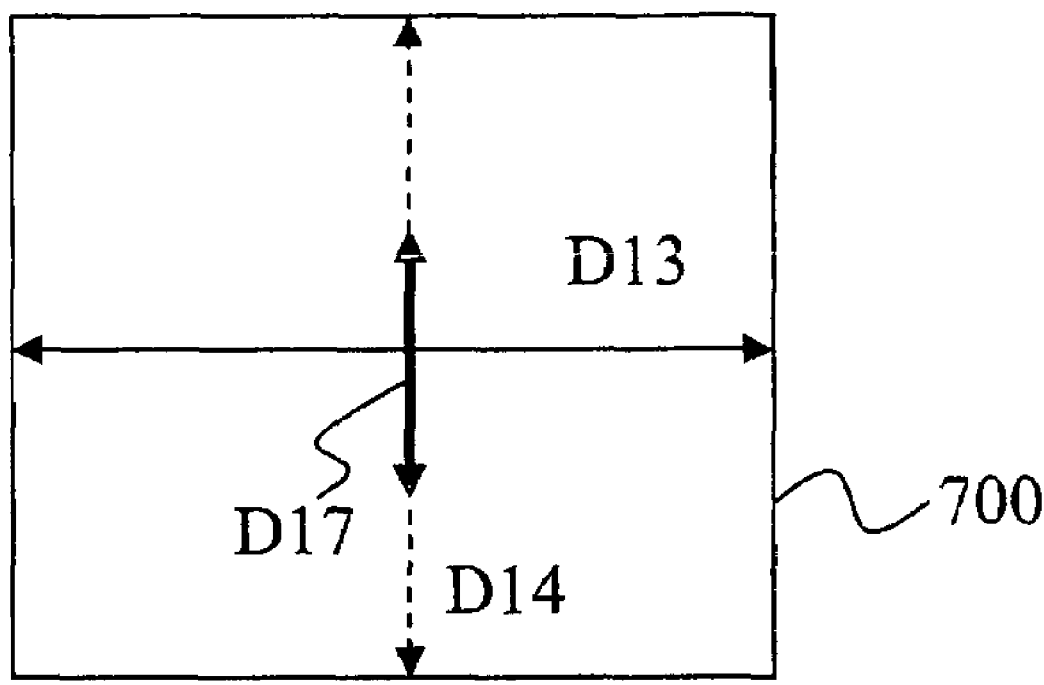
FIG. 11 is a diagram illustrating an observer and the LCD shown in FIG. 7A through FIG. 7C according to one embodiment of the present invention.
Figure 11:
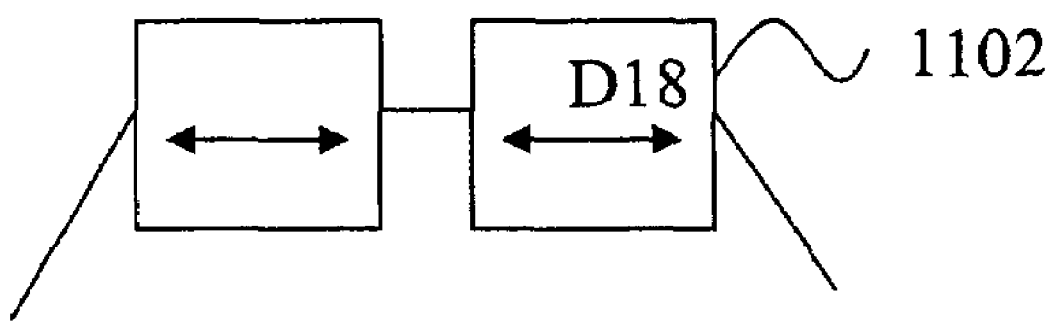

FIG. 11 is a diagram illustrating an observer and the LCD shown in FIG. 7A through FIG. 7C according to one embodiment of the present invention. Referring to FIG. 11, the image displayed by the LCD 700 shown in FIG. 7A has a polarization direction D17 perpendicular to the direction D13. Therefore, when the observer views the LCD with a conventional pair of polarized sunglasses 1102 having an absorption axis with a direction D18, for example, perpendicular to the polarization direction D17 of the image displayed by the LCD 700, the brightness observed by the observer with the sunglasses 1102 may not be significantly reduced as compared to the prior art.

Figure 12:
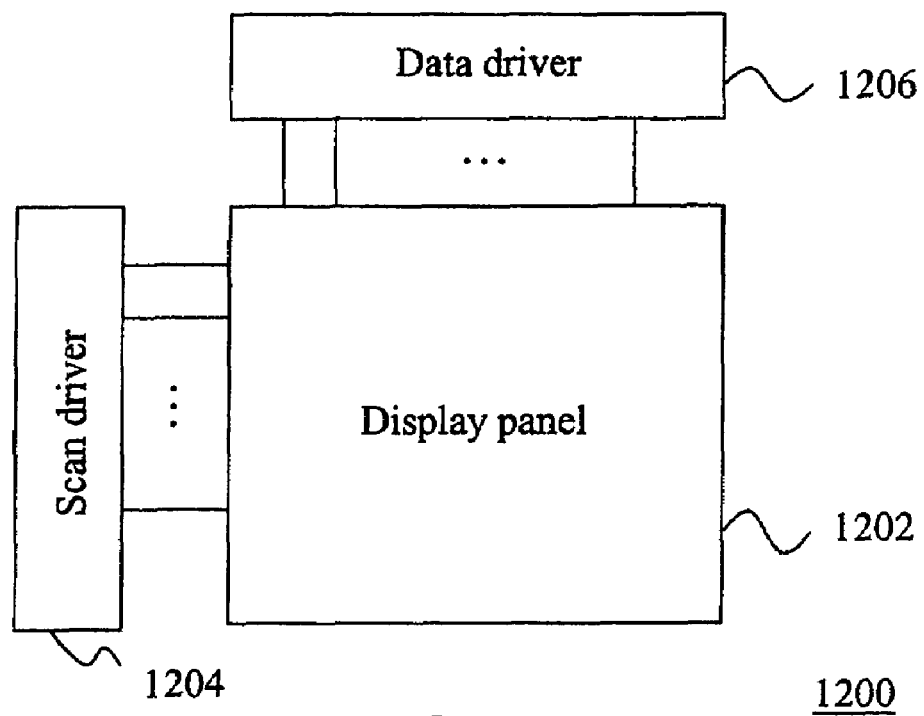
FIG. 12 is a block diagram illustrating a display device according to one embodiment of the present invention.

FIG. 12 is a block diagram illustrating a display device according to one embodiment of the present invention. The display device 1200 may comprise, for example, a display panel 1202, a scan driver 1204 connected to the display panel via a plurality of scan lines, and a data driver 1206 connected to the display panel via a plurality of data lines. The scan driver and data driver operatively control the display panel to render an image. The display panel 1202 of the present invention has been described in the description above (as shown in FIGS. 7A, 7B and 7C), and will not be repeated again.

Figure 13:
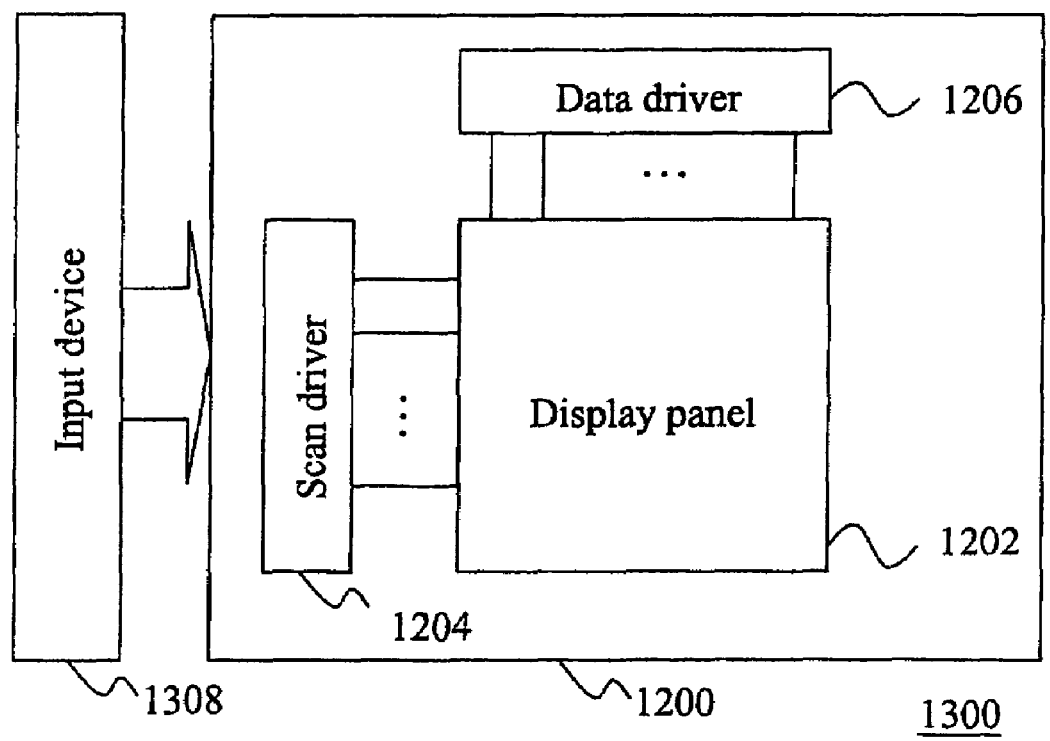
FIG. 13 is a block diagram illustrating an electronic device according to one embodiment of the present invention.

FIG. 13 is a block diagram illustrating an electronic device according to one embodiment of the present invention. Referring to FIG. 13, an electronic device 1300 comprises, for example, the display device 1200 as shown in FIG. 12 and an input device 1308 connected to the display device 1200 to render an image. The input device 1308 may be adopted for receiving the image data, the command from the user and so on. The display device 1200 of the present invention has been described in the description above, and will not be repeated again. The electronic device 610 may be a portable device such as a PDA, notebook computer, tablet computer, cellular phone, or a display monitor device, or a non-portable device such as a desktop computer.

Accordingly, in the present invention, since the direction of the absorption axis of the polarizer of the LCD panel is not substantially parallel to the direction of the rubbing of the alignment surface of the substrates of the LCD panel, the problem of the low contrast ratio as the azimuthal coordinate is close to 270°, the problem of the gray scale inversion and the reduction of brightness when a user wears such as a sunglasses are improved drastically.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel, comprising:
 a first substrate having a first alignment surface in a first alignment direction;
 a second substrate parallel and opposite to the first substrate, having a second alignment surface in a second alignment direction;
 liquid crystal molecules disposed between the first alignment surface and the second alignment surface;

a first polarizer having a first absorption axis and disposed over the first substrate;

a second polarizer having a second absorption axis and disposed over the second substrate, wherein an angle between the first absorption axis and the first alignment direction as well as an angle between the second absorption axis and the second alignment direction are in a range of about 45°±10° respectively;

a first optical compensation film having a first optical axis and disposed between the first substrate and the first polarizer;

a second optical compensation film having a second optical axis and disposed between the second substrate and the second polarizer, wherein the first optical axis and the first alignment direction as well as the second optical axis and the second alignment direction are in parallel; and a third optical compensation film disposed between the first optical compensation film and the first polarizer, wherein the third optical compensation film satisfies a relation nx=nz≠ny or ny=nz≠nx, wherein nx and ny are in-plane main refractive indices and nz is a thickness-wise refractive index.

2. The display panel of claim 1, wherein the angle between the first alignment direction and the second alignment direction is in a range of about 90°±10°.

3. The display panel of claim 1, wherein an angle between the first optical axis and the first alignment direction as well as an angle between the second optical axis and the second alignment direction are in a range of about 0~10° respectively.

4. The display panel of claim 1, wherein a sign of a difference between double refractive index of the liquid crystal molecules is different from a sign of a difference between double refraction index of the first optical compensation or the second optical compensation film.

5. The display panel of claim 1, wherein the angles between the directions of the slow axis of the third optical compensation film and the first absorption axis of the first polarizer is in a range of about 90°±10°.

6. A display panel, comprising:
a first substrate having a first alignment surface in a first alignment direction;
a second substrate parallel and opposite to the first substrate, having a second alignment surface in a second alignment direction;
liquid crystal molecules disposed between the first alignment surface and the second alignment surface;
a first polarizer having a first absorption axis and disposed over the first substrate;
a second polarizer having a second absorption axis and disposed over the second substrate, wherein an angle between the first absorption axis and the first alignment direction as well as an angle between the second absorption axis and the second alignment direction are in a range of about 45°±10° respectively;
a first optical compensation film having a first optical axis and disposed between the first substrate and the first polarizer;
a second optical compensation film having a second optical axis and disposed between the second substrate and the second polarizer, wherein the first optical axis and the first alignment direction as well as the second optical axis and the second alignment direction are in parallel; and
a third optical compensation film disposed between the second optical compensation films and the second polarizer, wherein the third optical compensation film satisfies a relation nx=nz≠ny or ny=nz≠nx, wherein nx and ny are in-plane main refractive indices and nz is a thickness-wise refractive index.

7. The display panel of claim 6, wherein the angles between the directions of the slow axis of the third optical compensation film and the second absorption axis of the second polarizer is in a range of about 90°±10°.

8. The display panel of claim 1, wherein the first polarizer is disposed on a side of the first substrate outside of the liquid crystals, and the second polarizer is disposed on a side of the second substrate outside of the liquid crystals.

9. A display device, comprising:
a display panel as in claim 1; and
a scan driver and a data driver connected to the display panel to control the display panel to render an image in accordance with an input data.

10. An electronic device, comprising:
a display device as in claim 9; and
an input device for providing the input data to the display device for displaying the image.

11. The display device of claim 9, wherein the angle between the first alignment direction and the second alignment direction is in a range of about 90°±10°.

12. The display device of claim 9, wherein an angle between the first optical axis and the first alignment direction as well as an angle between the second optical axis and the second alignment direction are in a range of about 0~10° respectively.

13. The display device of claim 9, wherein a sign of a difference between double refractive index of the liquid crystal molecules is different from a sign of a difference between double refraction index of the first optical compensation or the second optical compensation film.

14. The display device of claim 9, wherein the angles between the directions of the slow axis of the third optical compensation film and the first absorption axis of the first polarizer is in a range of about 90°±10°.

15. A display device, comprising:
a display panel as in claim 6; and
a scan driver and a data driver connected to the display panel to control the display panel to render an image in accordance with an input data.

16. The display device of claim 15, wherein the angles between the directions of the slow axis of the third optical compensation film and the second absorption axis of the second polarizer is in a range of about 90°±10°.

17. The display device of claim 15, wherein the first polarizer is disposed on a side of the first substrate outside of the liquid crystals, and the second polarizer is disposed on a side of the second substrate outside of the liquid crystals.

18. The electronic device of claim 10, wherein the angle between the first alignment direction and the second alignment direction is in a range of about 90°±10°.

* * * * *